(12) United States Patent
Ikekame et al.

(10) Patent No.: US 8,845,228 B2
(45) Date of Patent: Sep. 30, 2014

(54) FIXING STRUCTURE FOR TWO MEMBERS

(75) Inventors: Eisaku Ikekame, Tochigi (JP);
Tomoyuki Mizunuma, Tochigi (JP)

(73) Assignee: TS Tech Co., Ltd., Tochigi (JP)

( * ) Notice: Subject to any disclaimer, the term of this patent is extended or adjusted under 35 U.S.C. 154(b) by 45 days.

(21) Appl. No.: 13/074,770

(22) Filed: Mar. 29, 2011

(65) Prior Publication Data

US 2011/0243656 A1    Oct. 6, 2011

(30) Foreign Application Priority Data

Mar. 31, 2010    (JP) .................. 2010-082754
Mar. 31, 2010    (JP) .................. 2010-082761

(51) Int. Cl.

| | | |
|---|---|---|
| *F16B 5/00* | (2006.01) | |
| *B29C 65/00* | (2006.01) | |
| *B29C 65/60* | (2006.01) | |
| *B29L 31/30* | (2006.01) | |
| *B29C 65/18* | (2006.01) | |
| *B29C 65/78* | (2006.01) | |
| *F16B 5/04* | (2006.01) | |

(52) U.S. Cl.
CPC ....... *B29C 65/607* (2013.01); *B29L 2031/3014* (2013.01); *B29C 66/55* (2013.01); *B29C 65/18* (2013.01); *B29C 65/7835* (2013.01); *F16B 5/045* (2013.01); *B29C 66/723* (2013.01); *B29C 66/71* (2013.01); *B29C 66/727* (2013.01)
USPC .................. 403/408.1; 403/167; 411/546

(58) Field of Classification Search
USPC .............. 403/109.1, 167, 242, 252, 274, 306, 403/331, 339, 345, 346, 359, 363, 380, 403/408.1, 409.1, 347; 411/546
See application file for complete search history.

(56) References Cited

U.S. PATENT DOCUMENTS

| | | | | |
|---|---|---|---|---|
| 3,395,602 | A * | 8/1968 | Strange ................... | 411/437 |
| 4,176,807 | A * | 12/1979 | Kwon ..................... | 242/394 |
| 4,402,338 | A * | 9/1983 | Moller ................. | 137/315.09 |
| 5,777,831 | A * | 7/1998 | Konno ................... | 360/132 |
| 5,904,581 | A * | 5/1999 | Pope et al. ............... | 439/74 |
| D470,039 | S * | 2/2003 | Pelc ........................ | D8/382 |
| D485,160 | S * | 1/2004 | Pelc ........................ | D8/382 |
| 7,712,992 | B2 * | 5/2010 | Hirose et al. ............. | 403/168 |
| 7,736,082 | B1 * | 6/2010 | Mattheis ................. | 403/329 |
| 2002/0004661 | A1 * | 1/2002 | Sevrain et al. ............. | 606/73 |
| 2002/0021655 | A1 * | 2/2002 | Shin ....................... | 369/247 |

(Continued)

FOREIGN PATENT DOCUMENTS

| | | | |
|---|---|---|---|
| EP | 133839 | A2 * | 3/1985 |
| JP | 45-033365 | | 12/1970 |

(Continued)

*Primary Examiner* — Daniel P Stodola
*Assistant Examiner* — Nahid Amiri
(74) *Attorney, Agent, or Firm* — Hamre, Schumann, Mueller & Larson, P.C.

(57) ABSTRACT

A fixing structure for a first and second member, in which the first member has a base portion and a boss extending from the base portion, and the second member has a base portion to which a distal end of the boss is fixed. The fixing structure includes a spacer portion disposed around the boss and configured to keep a distance between the base portion of the first member and the base portion of the second member when the first and the second member are assembled together through the fixing structure. The spacer portion is formed on the second member in such a manner as to extend from the base portion of the second member and come into contact with the base portion of the first member.

13 Claims, 11 Drawing Sheets

(56) References Cited

U.S. PATENT DOCUMENTS

| | | | |
|---|---|---|---|
| 2003/0198566 A1* | 10/2003 | Dewar et al. | 418/55.2 |
| 2005/0074280 A1* | 4/2005 | Chen | 403/329 |
| 2008/0317545 A1* | 12/2008 | Hirose et al. | 403/14 |

FOREIGN PATENT DOCUMENTS

| | | |
|---|---|---|
| JP | 04-101004 | 9/1992 |
| JP | 02-044106 | 3/1999 |
| JP | 2001-227522 | 8/2001 |
| JP | 2003-260739 | 9/2003 |
| JP | 2005-288745 | 10/2005 |
| JP | 2006-027014 | 2/2006 |
| JP | 2007-030620 | 2/2007 |
| JP | 2009-002466 | 1/2009 |
| JP | 2009-166782 | 7/2009 |
| JP | 2010-269627 | 12/2010 |

* cited by examiner

FIXING STRUCTURE FOR TWO MEMBERS

CROSS REFERENCE TO RELATED APPLICATIONS

This application claims the foreign priority benefit under Title 35, United States Code, §119(a)-(d) of Japanese Patent Application Nos. 2010-082754 and 2010-082761, both filed on Mar. 31, 2010 in the Japan Patent Office, the disclosures of which are herein incorporated by reference in their entirety.

BACKGROUND OF THE INVENTION

The present invention relates to a fixing structure for two members, and more particularly to a fixing structure with a boss by which the two members are fixed together.

A fixing structure for a first and a second member is conventionally known, for example, from Japanese Laid-open Patent Application Publication No. 2009-166782 in which a first member has a base portion and a boss sticking out from the base portion, and a second member has a base portion to which a distal end of the boss is fixed. To be more specific, this fixing structure includes a plurality of ribs extending radially outward from the boss to connect the base portion and the boss. These ribs operate to reinforce the boss or to keep a distance between the two members.

However, in this conventional fixing structure, if a load is applied from the first member to the second member, in the vicinity of the boss of the first member, in an axial direction of the boss, stress is concentrated on the basal portion of each rib (i.e., outer edge corners between the rib and the base portion), so that the first member may be concentrically loaded. It would thus be desirable to distribute the stress.

in view of the above, the present invention seeks to provide a fixing structure which can effectively prevent stress from concentrating on one of the two members when a load is applied in the axial direction of the boss.

SUMMARY OF THE INVENTION

According to a first aspect of the present invention, there is provided a fixing structure for a first and a second member, in which the first member has a base portion and a boss extending from the base portion, and the second member has a base portion to which a distal end of the boss is fixed. The fixing structure comprises a spacer portion disposed around the boss and configured to keep a distance between the base portion of the first member and the base portion of the second member when the first and the second member are assembled together through the fixing structure. The spacer portion is formed on the second member in such a manner as to extend from the base portion of the second member and come into contact with the base portion of the first member.

With this configuration of the fixing structure, when a load is applied in the vicinity of the boss of the first member in the axial direction of the boss, the load is transmitted to the second member though the spacer portion of the second member, so that as compared with the configuration in which the spacer portion is provided only on the first member, integrally with the boss, the load can be distributed over the second member to prevent stress from concentrating on the first member.

In one embodiment, the spacer portion of the second member may comprise a plurality of ribs extending radially outward from the boss to surroundingly support the boss.

With this configuration, since the boss is reinforced (i.e., break-off of the boss can be prevented) by the plurality of radially-arranged ribs, the rigidity of the boss can be enhanced.

In another embodiment, the aforementioned fixing structure may further comprise a spacer portion configured to extend from the base portion of the first member and come into contact with the base portion of the second member, and each spacer portion of the first and the second member may be configured such that an area of contact between the spacer portion of the second member and the base portion of the first member is greater than that between the spacer portion of the first member and the base portion of the second member.

With this configuration, since the area of contact between the spacer portion of the second member and the base portion of the first member is greater than that between the spacer portion of the first member and the base portion of the second member, the load can be distributed over the second member to prevent stress from concentrating on the first member.

In one embodiment, the spacer portion of the first member may comprise a plurality of ribs extending radially outward from the boss to surroundingly support the boss.

With this configuration, since the boss is reinforced (i.e., break-off of the boss can be prevented) by the plurality of radially-arranged ribs, the rigidity of the boss can be enhanced.

In another embodiment of the aforementioned fixing structure, the spacer portion of the second member may comprise a cylindrical rib positioned to be spaced around the boss.

With this configuration, since the cylindrical rib does not come into contact with the boss, it is not necessary to strictly control the positional accuracy between the rib and the boss and the assembly of the first and the second member can be eased.

In still another embodiment of the aforementioned fixing structure, the base portion of the second member may be provided with a load absorbing member which is softer than the spacer portion and elastically deformable to absorb a load applied to the base portion of the second member, and the load absorbing member may come into contact with the base portion of the first member.

With this configuration, since the load absorbing member can absorb the load, a concentration of the stress on the first member can be further prevented.

In further embodiment of the aforementioned fixing structure, the spacer portion of the second member may comprise a first extension portion bent and extending from the base portion of the second member toward the first member, and a second extension portion bent at a distal end of the first extension portion and extending along the base portion of the first member to allow surface contact with the base portion of the first member.

With this configuration, since a wide surface of the second extension portion receives the load, a greater load can be distributed and received by the second member. Further, the load can also be absorbed by the elastic deformation of the first extension portion.

According to a second aspect of the present invention, there is provided a fixing structure for a first and a second member, in which the first member has a base portion, a boss extending from the base portion, and a plurality of ribs extending radially outward from the boss in such a manner as to connect the base portion and the boss, and the second member has a base portion to which a distal end of the boss is fixed with the plurality of ribs being in contact with the base portion of the second member at fringe portions of the ribs. At least one of the fringe portions has a cutout formed in an exposed region between the base portion of the first member and the base portion of the second member when the first and the second member are assembled together through the fixing structure.

With this configuration of the fixing structure, since at least one of the fringe portions has a cutout formed in the exposed region between the base portion of the first member and the base portion of the second member, when a load is applied in the vicinity of the boss of the first member in the axial direction of the boss, stress can be concentrated on the cutout. It is therefore possible to effectively prevent stress from concentrating on the basal portion of the ribs.

In one embodiment of the fixing structure, the base portion of the first member may be made of a foamed resin material having a plurality of internal voids.

With this configuration, the weight of the fixing structure can be reduced by the use of the foamed resin material and stress generated in the vicinity of the basal portion of the ribs can be lessened by the cutout, so that the foamed resin material having low strength is less affected by the load.

In another embodiment of the fixing structure, the base portion of the first member may have a pair of skin layers between which the foamed resin material is sandwiched, and the cutout may be formed at a height from a basal portion of the ribs not less than the thickness of the skin layer where the ribs are formed.

Experiments or simulation results show that stress is less likely to concentrate on the basal portion of the ribs if the cutout is formed at a height from the basal portion of the ribs not less than the thickness of the skin layer where the ribs are formed. Therefore, according to this fixing structure, stress applied to the basal portion of the ribs can be effectively reduced.

In further embodiment of the fixing structure, a plurality of cutouts may be formed in the fringe portion of one rib.

With this configuration, since stress can be distributed over a plurality of cutouts, the stress applied to the basal portion of the ribs can be reduced further.

BRIEF DESCRIPTION OF THE DRAWINGS

Other objects and aspects of the present invention will become more apparent by describing in detail illustrative, non-limiting embodiments thereof with reference to the accompanying drawings, in which:

FIGS. 7A and 7B show the fixing structure according to a fourth modified embodiment where ribs are provided on both first and second members, in which

FIGS. 9A to 9C show the fixing structure according to a fifth modified embodiment where the second member shown in FIG. 7B has an additional rib, in which

DETAILED DESCRIPTION OF THE INVENTION

With reference to the accompanying drawings, exemplary embodiments of the present invention will be described.

First Embodiment

Figure 1:
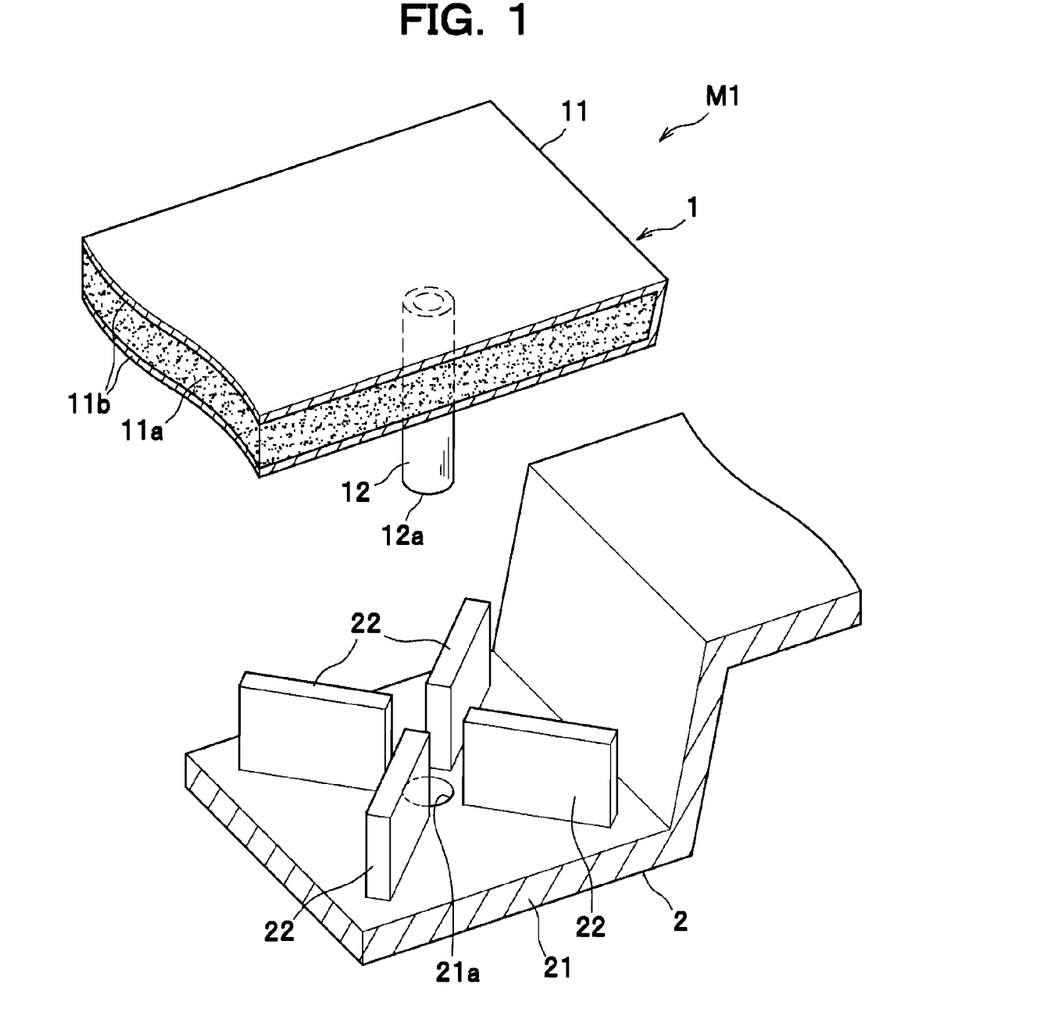
FIG. 1 is an exploded perspective view of a fixing structure for members according to a first embodiment of the present invention.

As seen in FIG. 1, a fixing structure M1 for members includes a plate-like first member 1 and a plate-like second member 2. Any members may be adopted as the first member 1 and the second member 2. For example, a door lining and an armrest mounted on the door lining may be adopted.

The first member 1 has a plate-like base portion 11 and a boss 12 sticking out from the base portion 11. The boss 12 is oriented toward the second member 2 when the first member 1 and the second member 2 are assembled together.

The base portion 11 includes a foamed resin material 11a having a plurality of internal voids, and a pair of skin layers 11b between which the foamed resin material 11a is sandwiched. The foamed resin material 11a may be any known material such as expanded polypropylene.

The boss 12 is integrally formed on one skin layer 11b (i.e., one of the skin layers positioned on the second member 2 side).

The second member 2 is a plate-like member made of resin. The second member 2 includes a plate-like base portion 21, and four (i.e., a plurality of) ribs 22, as an example of a spacer portion, configured to keep a distance between the base portion 11 of the first member 1 and the base portion 21 of the second member 2.

Figure 2A:
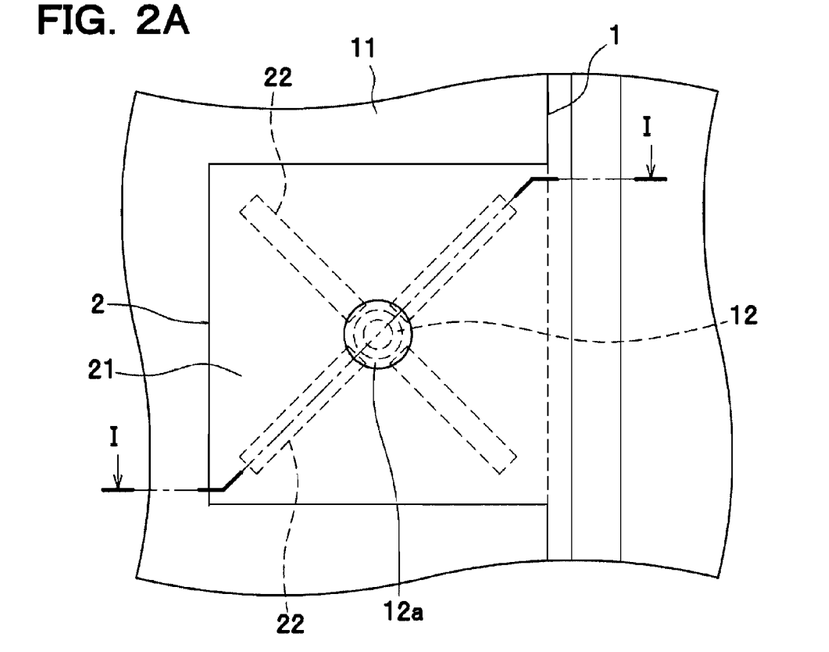
FIG. 2A is a bottom view of the fixing structure as viewed from bottom.
Figure 2B:
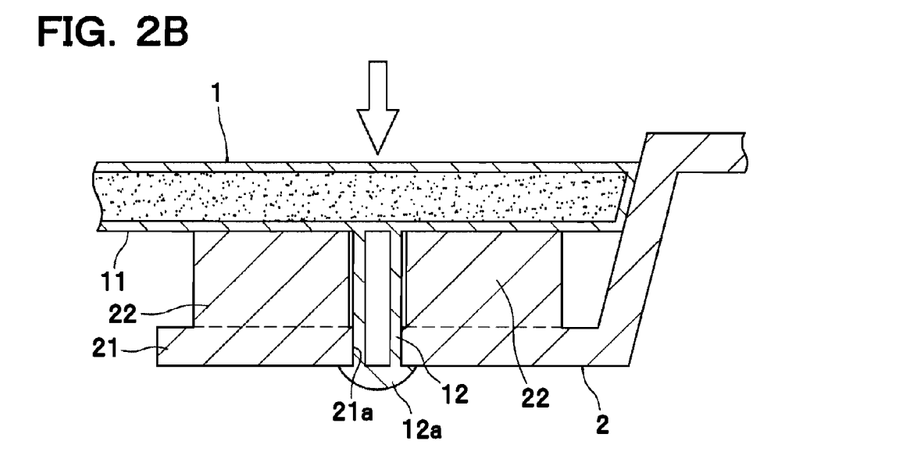
FIG. 2B is a sectional view taken along the lines I-I of FIG. 2A.

The base portion 21 has a through-opening 21a for fixing a distal end 12a of the boss 12. To be more specific, as best seen in FIG. 2B, the distal end 12a of the boss 12 is inserted into the opening 21a to pass therethrough, and then thermally fused using a heated jig, so that the distal end 12a of the boss 12 is secured to the base portion 21.

The ribs 22 are integrally formed on the base portion 21 and configured to stick out from the base portion 21 and come into contact with the base portion 11 of the first member 1 to thereby keep a distance between the first member 1 and the second member 2. As seen in FIGS. 2A and 1, the ribs 22 are disposed to be positioned in the vicinity of the boss 12 when the first member 1 and the second member 2 are fixed together and to extend radially outward (i.e., in a cross-shaped arrangement) from the boss 12. By this arrangement, the boss 12 of the first member 1 can be reinforced by the plurality of ribs 22 formed on the second member 2 and the rigidity of the boss 12 can be enhanced.

According to this embodiment, unlike the conventional fixing structure where the ribs are formed on the first member having the boss, the plurality of ribs 22 configured to keep a distance between the first and the second members 1, 2 and to reinforce the boss 12 are formed on the second member 2 on which the boss 12 is not formed. Therefore, as shown by the arrow of FIG. 2B, if a collision load is applied from the first member 1 to the second member 2, in the vicinity of the boss 12 of the first member 1, in the axial direction of the boss 12, and even if the base portion 11 of the first member 1 undergoes a deflection around the boss 12 in a downward direction toward the second member 2, stress will not concentrate on outer edge corners between each of the ribs 22 and the base portion 11 of the first member 1 because the ribs 22 are not fixed to the first member 1. Accordingly, the load can be distributed over the second member 2.

In other words, in the case where the boss and the ribs are integrally formed on the base portion of the first member as with the conventional fixing structure, when the boss and the ribs are displaced toward the second member due to the collision load and the base portion is inwardly deflected, stress is intensively applied to the outer edge corners between each of the ribs and the base portion (i.e., connecting portion); typically, a substantial change of shape is observed at the outer edge corners. On the contrary, according to this embodiment, since the ribs are not formed on the first member 1, that portion which undergoes a substantial change of shape is not present on the first member 1 so that the concentration of the stress on the first member 1 can be avoided.

Further, since the ribs 22 formed on the second member 2 are not integral with the boss 12, if the second member 2 undergoes a deflection in the vicinity of the opening 21a, the ribs 22 can freely change its direction without being constrained by the boss 12. Therefore, it is possible to prevent stress from concentrating on the basal portion of the ribs 22.

As described above, if a load is applied to the boss 12 in the axial direction of the boss 12, it is possible to effectively prevent stress from concentrating on one of the two members 1, 2.

Although the present invention has been described in accordance with the first embodiment, the present invention is not limited to this specific embodiment. As described in other modifications below, it is to be understood that various changes and modifications may be made without departing from the scope of the appended claims. In the following description, parts substantially similar to those previously described in the first embodiment will be denoted by the same reference numerals, and detailed description thereof will be omitted.

Figure 3A:
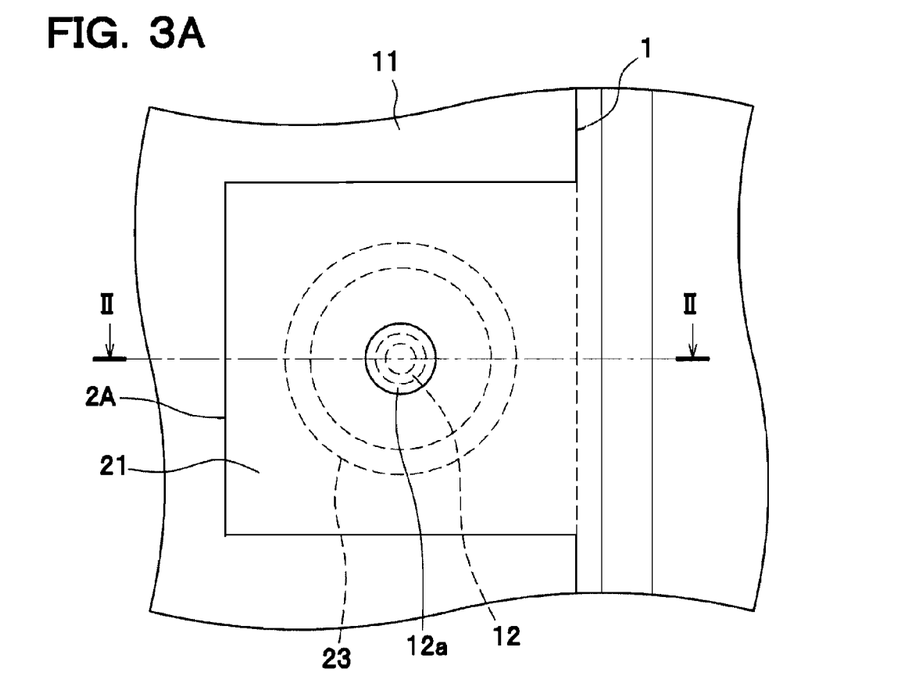
FIG. 3A is a top view of the fixing structure according to a first modified embodiment where a cylindrical rib is provided.
Figure 3B:
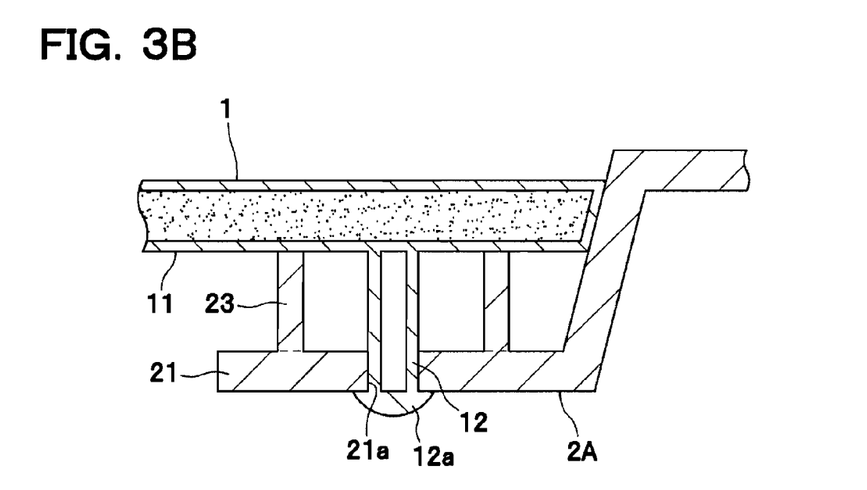
FIG. 3B is a sectional view taken along the lines II-II of FIG. 3A.

In the above-described embodiment, the radially-arranged ribs 22 are employed as a spacer portion. However, the present invention is not limited to this specific embodiment. For example, as seen in FIGS. 3A and 3B, a cylindrical rib 23 may be used. To be more specific, the rib 23 is positioned to be spaced around the boss 12. According to this arrangement, since the rib 23 is not adjacent to the boss 12, it is not necessary to strictly control the positional accuracy between the rib 23 and the boss 12, and the assembly of the first member 1 and the second member 2A can be eased.

Figure 4A:
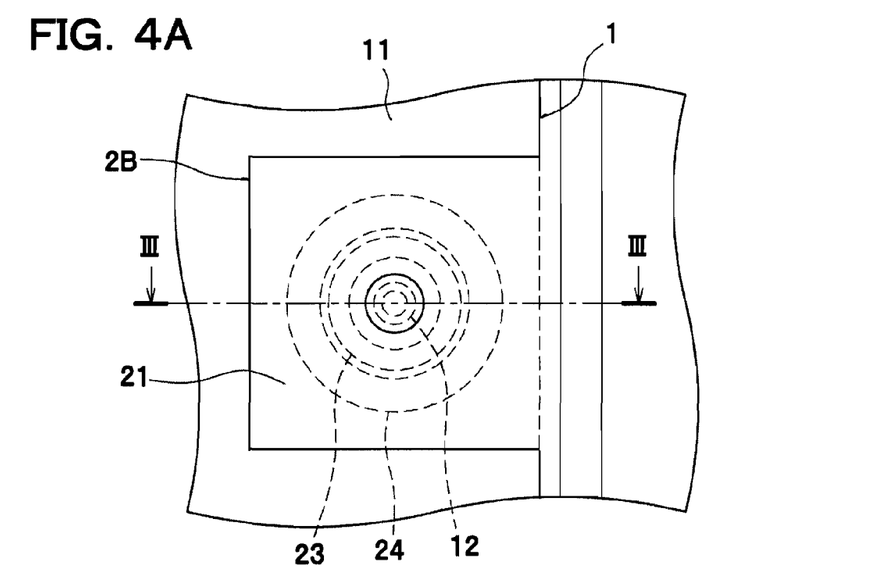
FIG. 4A is a top view of the fixing structure according to a second modified embodiment where a load absorbing member is provided.
Figure 4B:
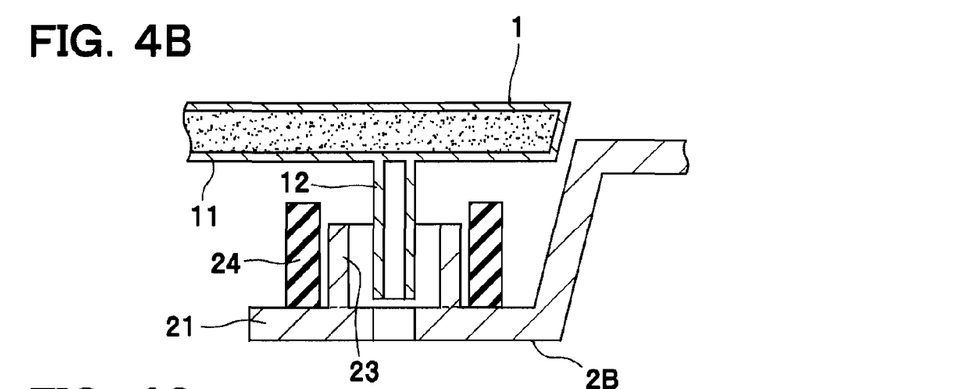
FIG. 4B is a sectional view taken along the lines III-III of FIG. 4A, illustrating the fixing structure before assembling two members.
Figure 4C:
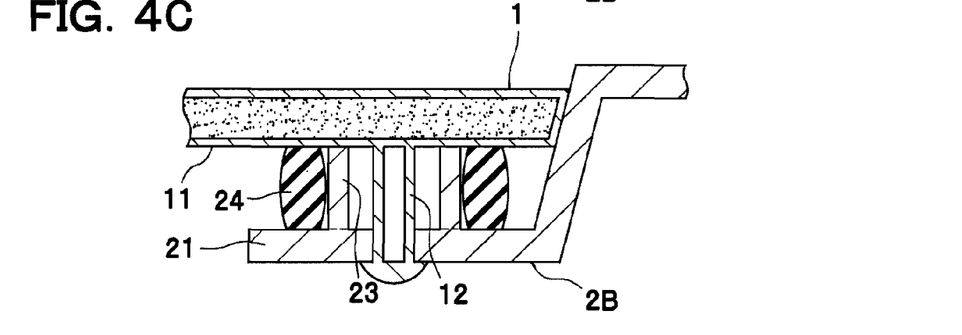
FIG. 4C is a sectional view similar to FIG. 4B but illustrating the fixing structure after assembling the two members.

Further, as best seen in FIGS. 4A to 4C, sponge 24 may be provided on the base portion 21 of the second member 2B in addition to the rib 23. The sponge 24, which is an example of a load absorbing member, is softer than the rib 23 and elastically deformable to absorb an impact force. Rubber or spring may be used as the load absorbing member.

To be more specific, the sponge 24 is shaped like a hollow cylinder. The sponge 24 is positioned outside and spaced around the cylindrical rib 23. As best seen in FIG. 4B, the height of the sponge 24 is taller than the rib 23; namely, the sponge 24 projects toward the first member 1 beyond the rib 23. Therefore, as seen in FIG. 4C, when the first and the second members 1, 2B are secured to each other, the sponge 24 is come into contact with the base portion 11 of the first member 1.

According to this arrangement, since the sponge 24 can absorb an impact load applied to the first member 1 in the vicinity of the boss 12, a concentration of the stress on the first member 1 can be further prevented. It is to be understood that the sponge 24 and the rib 23 may have arbitrary shapes other than the cylindrical shape.

Figure 5A:
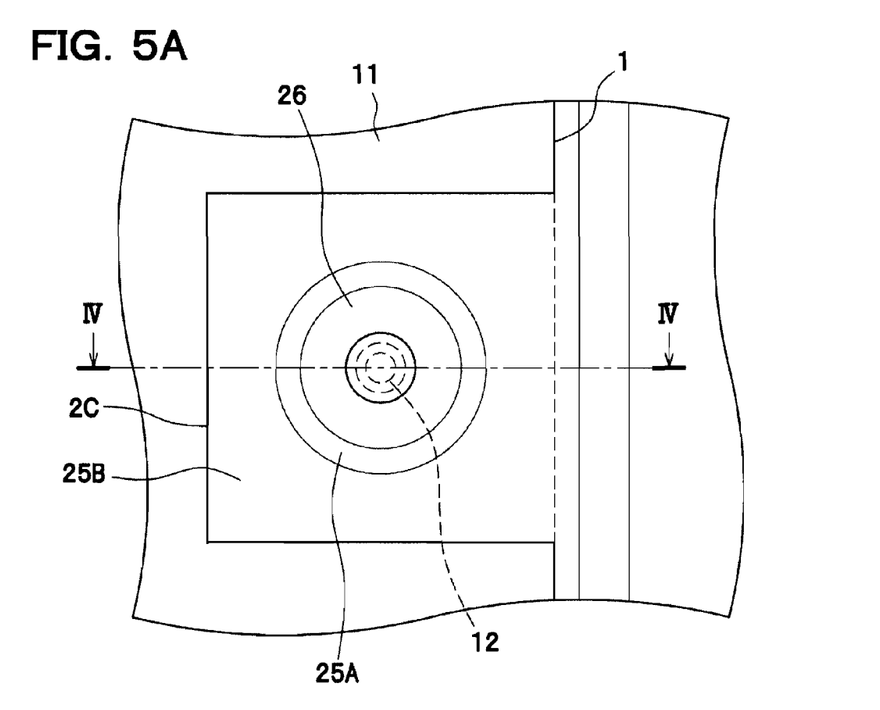
FIG. 5A is a top view of the fixing structure according to a third modified embodiment where a spacer portion is formed to have a bent shape.
Figure 5B:
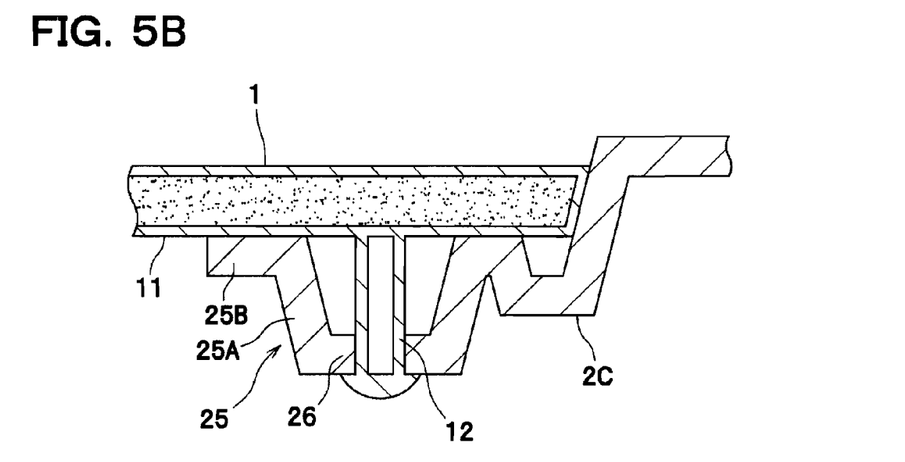
FIG. 5B is a sectional view taken along the lines IV-IV of FIG. 5A.

Further, as seen in FIGS. 5A and 5B, the spacer portion 25 of the second member 2C may include a first extension portion 25A bent at an end of and extending from the plate-like base portion 26 toward the first member 1, and a second extension portion 25B bent at the distal end of the first extension portion 25A and extending along the base portion 11 of the first member 1.

To be more specific, the outer diameter of the first extension portion 25A increases such that the first extension portion 25A is distanced away from the boss 12 with the distance from the base portion 26 to which the boss 12 is fixed toward the first member 1. This is advantageous, as compared with the first extension portion having a cylindrical shape (i.e., the outer diametrical portion of the first extension portion extends parallel to the axial direction of the boss 12), because the first extension portion 25A is deformable around the connecting portion between the base portion 26 and the first extension portion 25A and the impact load can be absorbed.

Further, the second extension portion 25B is bent outward at the distal end of the first extension portion 25A and extends along the base portion 11 of the first member 1 in a direction away from the boss 12 (i.e., in a radially outward direction). The second extension portion 25B is in surface contact with the base portion 11 of the first member 1. Since a wide surface of the second extension portion 25B receives the load, a greater load can be distributed and received by the second member 2C.

Figure 6:
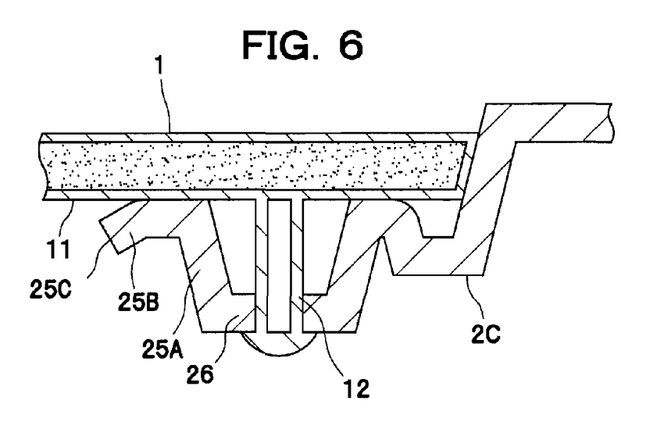
FIG. 6 is a sectional view similar to FIG. 5B but illustrating a modified second extension portion of the fixing structure.

As seen in FIG. 6, the second extension portion 25B may be curled at its edge portion 25C in a direction away from the base portion 11. According to this embodiment, since the edge portion 25C of the second extension portion 25B does not contact the base portion 11, the scratching of the base portion 11 by the edge portion 25C can be avoided.

Figure 7A:
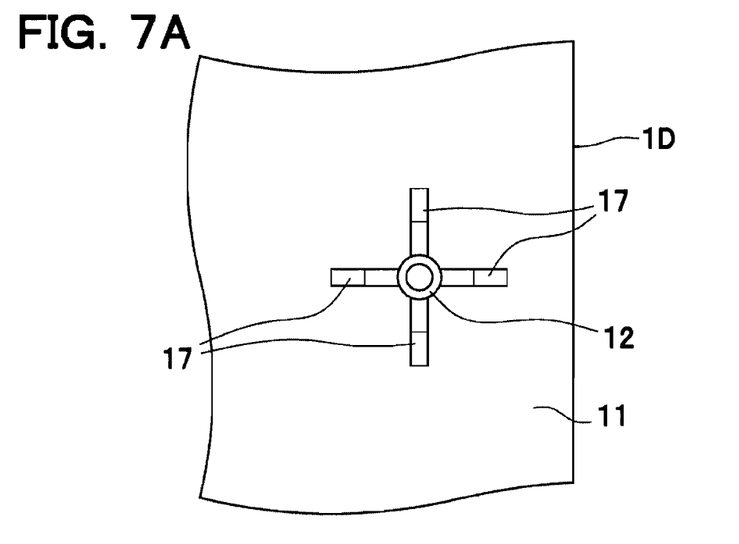
FIG. 7A is a top view of the first member.
Figure 7B:
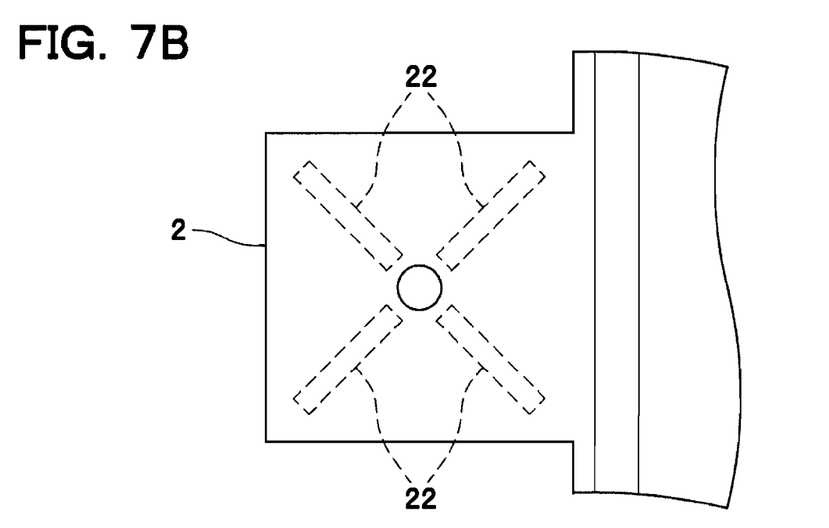
FIG. 7B is a top view of the second member.

In the above-described embodiment, the ribs 22 (i.e., spacer portion) are provided only on the second member 2. However, the present invention is not limited to this specific embodiment. For example, as seen in FIGS. 7A and 7B, in addition to the ribs 22 formed on the second member 2, the first member 1D may be provided with a plurality of ribs 17 (i.e., spacer portion) to keep the distance between the first member 1D and the second member 2.

Figure 8A:
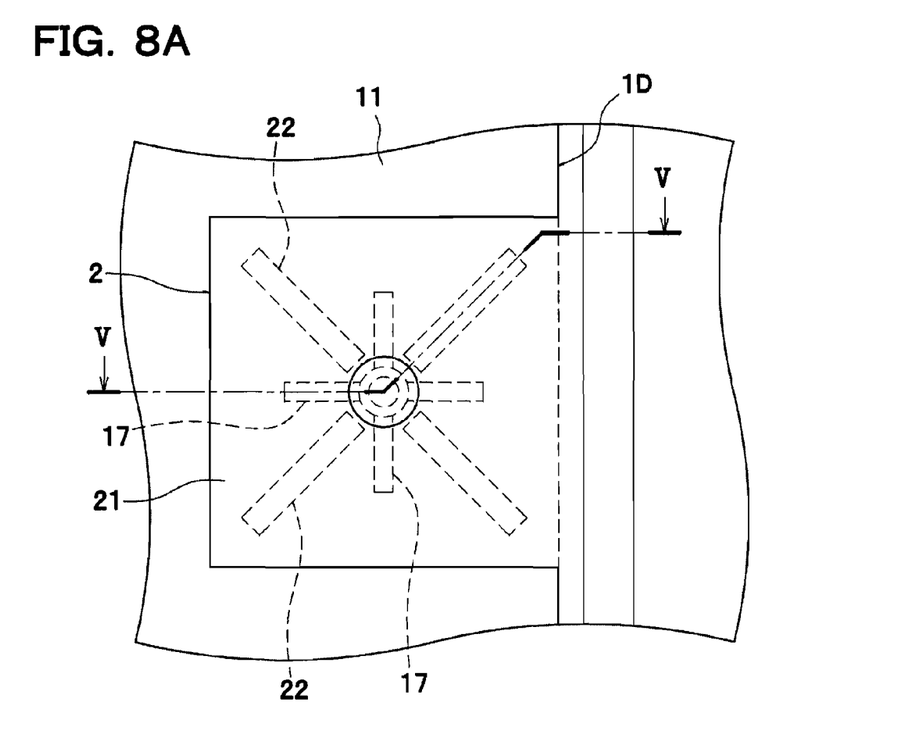
FIG. 8A is a top view showing a state where the first member shown in FIG. 7A and the second member shown in FIG. 7B are assembled together.
Figure 8B:
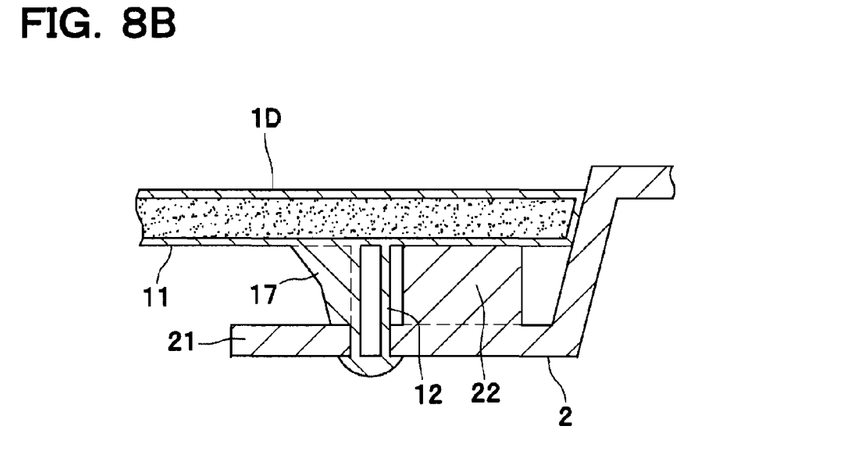
FIG. 8B is a sectional view taken along the lines V-V of FIG. 8A.

As best seen in FIGS. 8A and 8B, the ribs 17 of the first member 1D stick out from the base portion 11 of the first member 1D toward the second member 2 and are configured to come into contact with the base portion 21 of the second member 2 to thereby keep the distance between the first member 1D and the second member 2. To be more specific, four ribs 17 are arranged in the shape of a cross with the boss 12 at the center and integrally formed with the boss 12 and the base portion 11; the ribs 17 extend radially outward from the boss 12 in directions different from those of the ribs 22 so that the ribs 17, 22 do not overlap one another. By this arrangement of the ribs 17, the boss 12 can be strongly reinforced by the ribs 17.

As best seen in FIG. 8A, the rib 22 of the second member 2 is wider and longer in the radial direction than the rib 17 of the first member 1D. In other words, each of the ribs 17, 22 is configured such that an area of contact between the rib 22 of the second member 2 and the base portion 11 of the first member 1D is greater than that between the rib 17 of the first member 1D and the base portion 21 of the second member 2.

According to this embodiment, since the ribs 22 of the second member 2 contact the opposite part (i.e., base portion 11) at areas wider than the ribs 17 of the first member 1D do, a greater load is distributed and received by the second member 2.

Figure 9A:
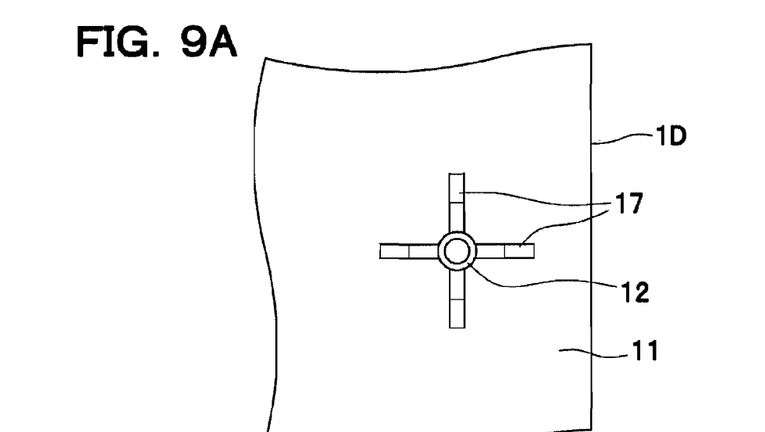
FIG. 9A is a top view of the first member.
Figure 9B:
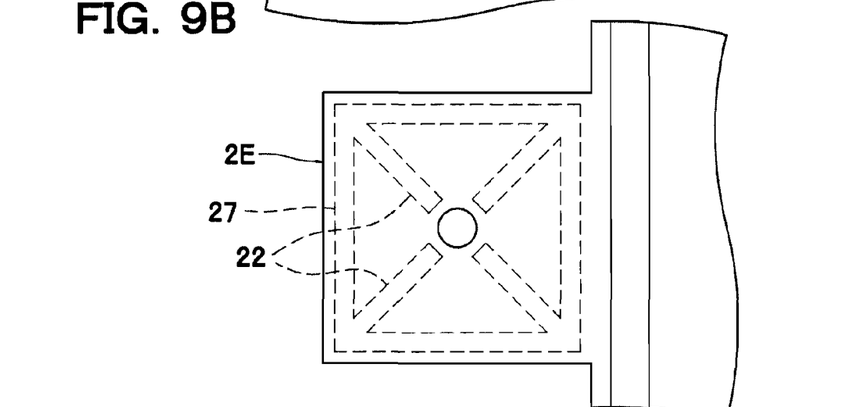
FIG. 9B is a top view of the second member.
Figure 9C:
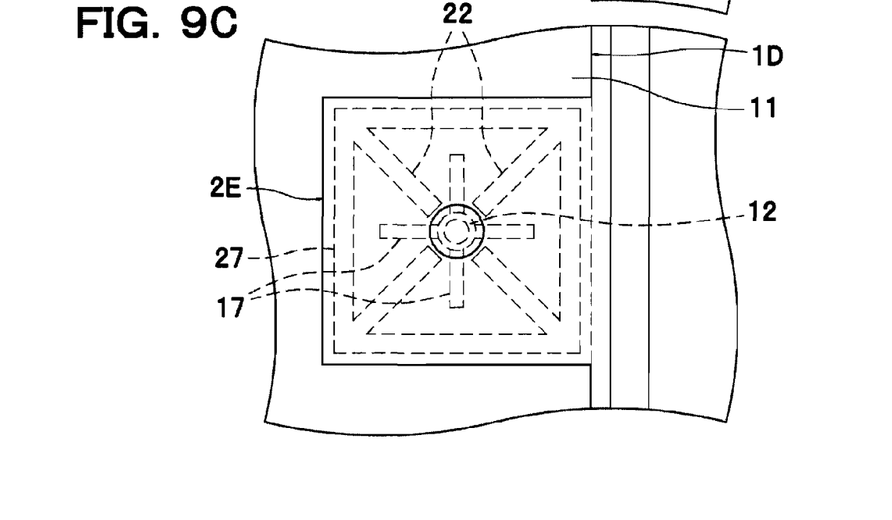
FIG. 9C is a top view showing the assembly of the first and the second member.

Further, as seen in FIGS. 9A to 9C, the four ribs 22 such as shown in FIG. 8A may be integrally connected using a rectangular tubular rib 27. According to this embodiment, since the rigidity of each rib 22 is enhanced, it is possible to reliably keep the distance between the first member 1D and the second member 2E as well as to perform the reinforcement of the boss 12. In the case where the rectangular rib 27 has the same height as the ribs 22, the area of contact between the ribs 22, 27 and the base portion 11 of the first member 1D becomes much wider, and a greater load is distributed and received by the second member 2E.

Other than the configurations of the spacer portion as described above, the spacer portion may be configured such that discrete parts (ribs) are fixed to the base portion using adhesive. Further, the shape or the number of the ribs (i.e., spacer portion) is not limited to the above-described embodiments. For example, various shapes of spacer portions such as a cylindrical or a polygonal spacer may be employed, and one or more of such spacer portions may be employed.

In the above-described embodiment, the distal end 12a of the boss 12 is fixed to the base portion 21 of the second member 2 by heat staking. However, the present invention is not limited to this specific fabrication process. For example, the boss may be fixed to the base portion of the second member by a screw.

Further, in the above-described embodiment, the base portion 11 is made of a foamed resin material. However, the present invention is not limited to this specific configuration, and the base portion may be made of a resin material such as non-foamed polypropylene. The use of the foamed resin material 11a as with the above-described embodiment is advantageous in terms of reducing the weight of the base portion. However, in consideration of the strength when a load is applied to the base portion, the base portion according to this modified embodiment is particularly advantageous for the increased strength.

Second Embodiment

Figure 10:
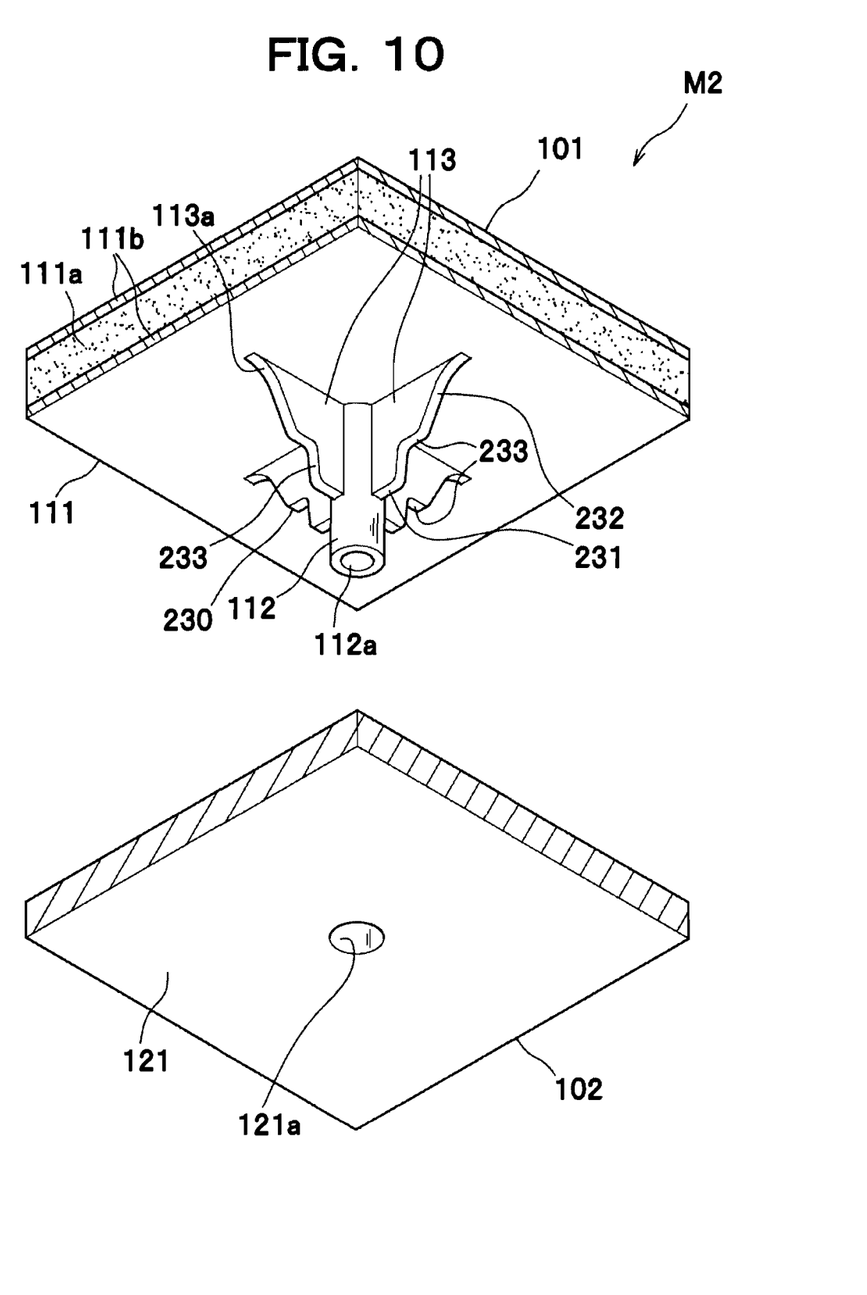
FIG. 10 is an exploded perspective view of a fixing structure for members according to a second embodiment of the present invention.

As seen in FIG. 10, a fixing structure M2 for members includes a plate-like first member 101 and a plate-like second member 102. Any members may be adopted as the first member 101 and the second member 102. For example, a door lining and an armrest mounted on the door lining may be adopted.

The first member 101 has a plate-like base portion 111, a boss 112 sticking out from the base portion 111, and four (i.e., a plurality of) ribs 113 extending radially outward from the boss 112 (i.e., arranged in the shape of a cross with the boss 112 at the center) to connect the base portion 111 and the boss 112. The boss 112 is oriented toward the second member 102 when the first member 101 and the second member 102 are assembled together.

The base portion 111 includes a foamed resin material 111a having a plurality of internal voids, and a pair of skin layers 111b between which the foamed resin material 111a is sandwiched. The foamed resin material 111a may be any known material such as expanded polypropylene.

The boss 112 and the ribs 113 are integrally formed on one skin layer 111b (i.e., one of the skin layers positioned on the second member 102 side). Detailed description of the ribs 113 will be described later.

The second member 102 is a plate-like member made of resin. The second member 102 includes a plate-like base portion 121.

Figure 11:
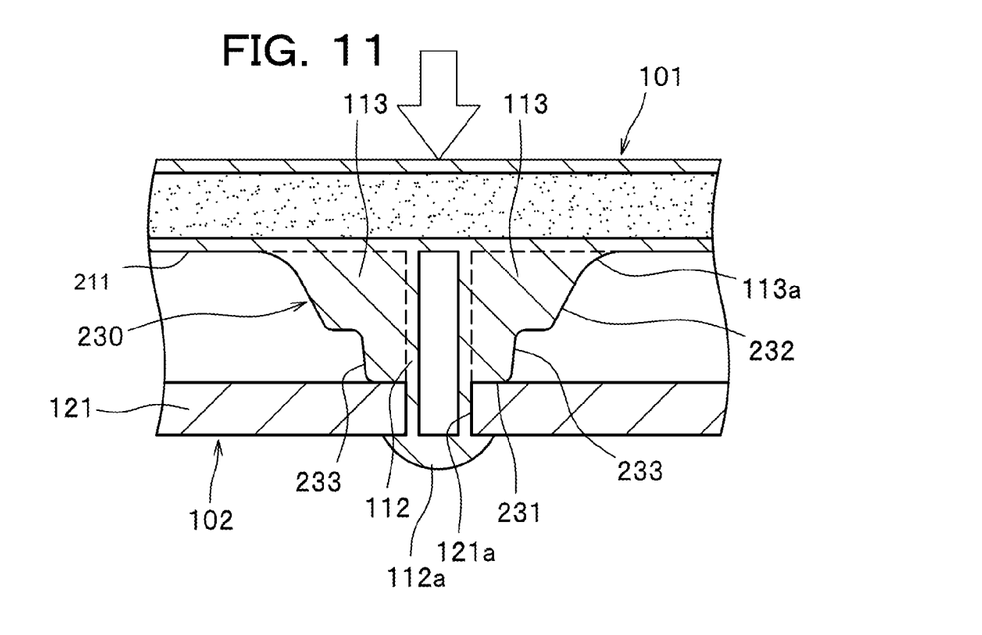
FIG. 11 is a sectional view of the fixing structure shown in FIG. 10.

The base portion 121 has a through-opening 121a for fixing a distal end 112a of the boss 112. To be more specific, as best seen in FIG. 11, the distal end 112a of the boss 112 is inserted into the opening 121a to pass therethrough, and then thermally fused using a heated jig, so that the distal end 112a of the boss 112 is secured to the base portion 121. To be more specific, the distal end 112 of the boss 112 is fixed to the base portion 121 with the plurality of ribs 113 being in contact with the base portion 121 at fringe portions 230 (supporting portions 231) of the ribs 113.

<Detailed Structure of Ribs>

Detailed structure of the ribs 113 will be described below.

Each rib 113 is shaped like a plate having a fringe portion 230. The fringe portion 230 mainly includes a supporting portion 231 configured to come into contact with the base portion 121 of the second member 102, and a side portion 232 extending from the distal end 112a side of the boss 112 toward the base portion 111. As best seen in FIG. 11, when the first member 101 and the second member 102 are assembled together, the side portion 232 is exposed between the base portion 111 of the first member 101 and the base portion 121 of the second member 102. The side portion 232 has a (right-angled) step-like cutout 233 in a position near the second member 102.

Accordingly, as shown by the arrow of FIG. 11, if a collision load is applied from the first member 101 to the second member 102, in the vicinity of the boss 112 of the first member 101, in the axial direction of the boss 112, and even if the base portion 111 of the first member 101 undergoes a deflection around the boss 112 in a downward direction toward the second member 102, stress will concentrate on the cutouts 233. Further, since the rib 113 is easy to undergo elastic deformation because of the cutout 233, an impact load can be absorbed by the elastic deformation of the rib 113.

In this exemplary embodiment, all of the four ribs 113 have a cutout 233. Therefore, it is possible to effectively prevent stress from concentrating on a basal portion 113a of the ribs 113.

The cutouts 233 are formed not for supporting the second member 102 but for preventing the stress from concentrating on the basal portion 113a of the ribs 113. Therefore, as long as the cutout 233 does not adversely affect the assembly of the first and the second member 101, 102, it is preferable that the cutout 233 is formed in a position farther from the basal portion 113a of the ribs 113 (i.e., the reverse surface 211 of the base portion 111).

To be more specific, it is preferable that the cutout 233 is formed at a height from the basal portion 113a of the ribs 113 not less than the thickness of the skin layer 111b where the ribs 113 are formed. The reason why is that experiments' or simulations show that if the cutout 233 is formed at a height not less than the thickness of the skin layer 111b where the ribs 113 are formed, stress concentration on the basal portion 113a of the ribs 113 can be distributed and the base portion 111 is less affected by the load. On the contrary, in the case where the cutout 233 is formed at a height less than the thickness of the skin layer 111b where the ribs 113 are formed, it is shown that although the stress which would otherwise concentrate on the basal portion of the ribs can be distributed, too much stress is concentrated on the cutout and the base portion will be adversely affected by the load.

According to this embodiment, since stress can be concentrated on the cutout 233, it is possible to effectively prevent the stress from concentrating on the basal portion 113a of the ribs 113. Further, since the stress concentration on the basal portion 113a of the ribs 113 can be prevented in this embodiment, the foamed resin material 111a having a thin skin layer 111b can be used for reducing the weight.

Although the present invention has been described in accordance with the second embodiment, the present invention is not limited to this specific embodiment. As described in other modifications below, it is to be understood that various changes and modifications may be made without departing from the scope of the appended claims. In the following description, parts substantially similar to those previously described in the second embodiment will be denoted by the same reference numerals, and detailed description thereof will be omitted.

Figure 12:
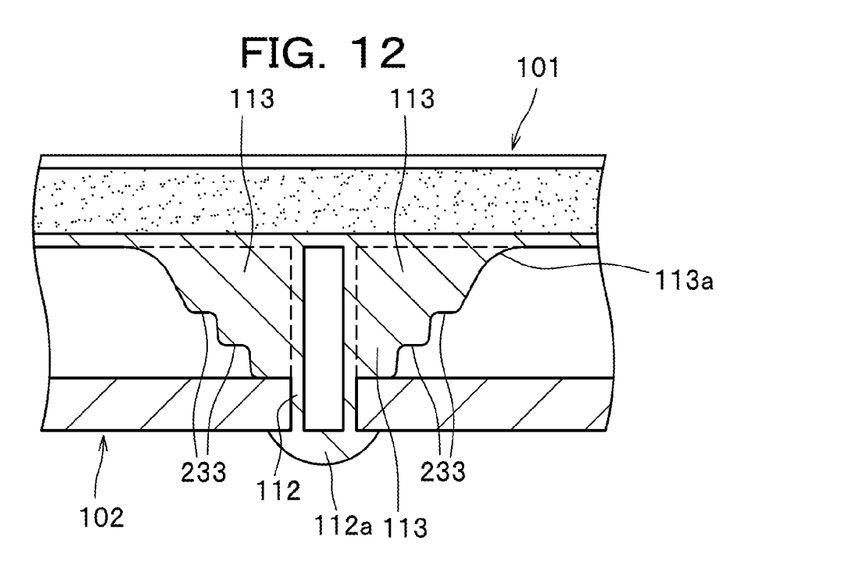
FIG. 12 is a modification of the fixing structure where each rib has two cutouts.

In the above-described embodiment, one cutout 233 is formed in one rib 113. However, the present invention is not limited to this specific embodiment. For example, as seen in FIG. 12, two (i.e., a plurality of) cutouts 233 may be formed in one rib 113. According to this configuration, since stress can be distributed over the two cutouts 233, the stress applied to the basal portion 113a of the ribs 113 can be reduced further. It is to be noted that three or more cutouts may be formed in the rib.

In the above-described embodiment, all the ribs 113 have a cutout 233. However, the present invention is not limited to this specific embodiment, and at least one rib may have a cutout. The shape of the cutout may not be limited to a specific shape as long as the stress can be distributed by the cutout.

In the above-described embodiment, the distal end 112a of the boss 112 is fixed to the base portion 121 of the second member 102 by heat staking. However, the present invention is not limited to this specific fabrication process. For example, the boss may be fixed to the base portion of the second member by a screw.

Further, in the above-described embodiment, the base portion 111 is made of a foamed resin material 111a. However, the present invention is not limited to this specific configuration, and the base portion may be made of a resin material such as non-foamed polypropylene. The use of the foamed resin material 111a as with the above-described embodiment is advantageous in terms of reducing the weight of the base portion. However, in consideration of the strength when a load is applied to the base portion, the base portion according to this modified embodiment is particularly advantageous for the increased strength.

What is claimed is:

1. A fixing structure comprising:
    a first member having a first base portion and a boss extending from the first base portion;
    a second member having a second base portion and a through-opening in the second base portion into which the distal end of the boss is fixed; and
    a spacer portion formed on the second member and configured to extend from the second base portion of the second member and come into contact with the first base portion of the first member;
    wherein the spacer portion is disposed around the boss and non-contact with the boss and configured to keep a distance between the first base portion of the first member and the second base portion of the second member when the first and second members are assembled together,
    wherein the spacer portion comprises a plurality of ribs extending radially outward from the boss to surroundingly support the boss, and
    wherein the plurality of ribs of the spacer portion are connected by a connecting rib in the form of an annular rib, and the connecting rib extends from the second base portion of the second member.

2. The fixing structure according to claim 1, wherein the connecting rib is a rectangular annular rib, and each rib of the spacer portion is connected at a corner portion of the rectangular annular rib.

3. The fixing structure according to claim 2, further comprising a first spacer portion configured to extend from the first base portion of the first member and come into contact with the second base portion of the second member,
    wherein the spacer portion is a second spacer portion and such that the second spacer portion is configured to extend from the second base portion of the second member and come into contact with the first base portion of the first member,
    wherein the first spacer portion comprises a plurality of ribs extending radially outward from the boss to surroundingly support the boss and each disposed between the plurality of ribs of the second spacer portion, and
    wherein the plurality of ribs of the first spacer portion extend toward straight portions of the rectangular annular rib such that an extension of each of the plurality of ribs orthogonally intersects a corresponding straight portion.

4. The fixing structure according to claim 1, further comprising a first spacer portion configured to extend from the first base portion of the first member and come into contact with the second base portion of the second member,
    wherein the spacer portion is a second spacer portion and such that the second spacer portion is configured to extend from the second base portion of the second member and come into contact with the first base portion of the first member, and
    wherein the first spacer portion comprises a plurality of ribs extending radially outward from the boss to surroundingly support the boss and non-contact with the connecting rib.

5. The fixing structure according to claim 1, further comprising a first spacer portion configured to extend from the first base portion of the first member and come into contact with the second base portion of the second member,
    wherein the spacer portion is a second spacer portion and such that the second spacer portion is configured to extend from the second base portion of the second member and come into contact with the first base portion of the first member,
    and wherein each of the first and second spacer portions of the first and second members is configured such that an area of contact between the second spacer portion of the second member and the first base portion of the first member is greater than that between the first spacer portion of the first member and the second base portion of the second member.

6. The fixing structure according to claim 5, wherein the first spacer portion of the first member comprises a plurality of ribs extending radially outward from the boss to surroundingly support the boss.

7. The fixing structure according to claim 6, wherein the plurality of ribs of the first spacer portion have a length shorter than that of the plurality of ribs of the second spacer portion.

8. A fixing structure comprising:
a first member having a first base portion and a boss extending from the first base portion;
a second member having a second base portion and a through-opening in the second base portion into which the distal end of the boss is fixed; and
a spacer portion formed on the second member and configured to extend from the second base portion of the second member and come into contact with the first base portion of the first member,
wherein the spacer portion is disposed around the boss and non-contact with the boss and configured to keep a distance between the first base portion of the first member and the second base portion of the second ember when the first and second members are assembled together,
wherein the spacer portion comprises a plurality of ribs extending radially outward from the boss to surroundingly support the boss,
wherein a height of the boss from the first base portion is greater than a height of the spacer portion from the second base portion, and a distal end of the boss is fixed to the second member by heat staking in a state of penetrating the through-opening, and wherein the plurality of ribs of the spacer portion are connected by a connecting rib in the form of an annular rib, and the connecting rib extends from the second base portion of the second member.

9. The fixing structure according to claim 8, wherein the connecting rib is a rectangular annular rib, and each rib of the spacer portion is connected at a corner portion of the rectangular annular rib.

10. The fixing structure of claim 9, further comprising a first spacer portion configured to extend from the first base portion of the first member and come into contact with the second base portion of the second member,
wherein the spacer portion is a second spacer portion and such that the second spacer portion is configured to extend from the second base portion of the second member and come into contact with the first base portion of the first member,
wherein the first spacer portion comprises a plurality of ribs extending radially outward from the boss to surroundingly support the boss and each disposed between the plurality of ribs of the second spacer portion, and
wherein the plurality of ribs of the first spacer portion extend toward straight portions of the rectangular annular rib such that an extension of each of the plurality of ribs orthogonally intersects a corresponding straight portion.

11. A fixing structure comprising:
a first member having a first base portion and a boss extending from the first base portion;
a second member having a second base portion and a through-opening in the second base portion into which the distal end of the boss is fixed; and
a spacer portion formed on the second member and configured to extend from the second base portion of the second member and come into contact with the first base portion of the first member,
wherein the spacer portion is disposed around the boss and non-contact with the boss and configured to keep a distance between the first base portion of the first member and the second base portion of the second member when the first and second members are assembled together,
wherein the spacer portion comprises a plurality of ribs extending radially outward from the boss to surroundingly support the boss,
wherein the plurality of ribs of the spacer portion are connected by a connecting rib in the form of an annular rib, and the connecting rib extends from the second base portion of the second member,
wherein a height of the boss from the first base portion is greater than a height of the spacer portion from the second base portion, and a distal end of the boss is fixed to the second member by heat staking in a state of penetrating the through-opening, and
wherein the first member and the second are a door lining and an armrest mounted on the door lining or vice versa.

12. The fixing structure according to claim 11, wherein the connecting rib is a rectangular annular rib, and each rib of the spacer portion is connected at a corner portion of the rectangular annular rib.

13. The fixing structure according to claim 12, further comprising a first spacer portion configured to extend from the first base portion of the first member and come into contact with the second base portion of the second member,
wherein the spacer portion is a second spacer portion and such that the second spacer portion is configured to extend from the second base portion of the second member and come into contact with the first base portion of the first member,
wherein the first spacer portion comprises a plurality of ribs extending radially outward from the boss to surroundingly support the boss and each disposed between the plurality of ribs of the second spacer portion, and
wherein the plurality of ribs of the first spacer portion extend toward straight portions of the rectangular annular rib such that an extension of each of the plurality of ribs orthogonally intersects a corresponding straight portion.

* * * * *